US012111869B2

(12) United States Patent
Akkapeddi

(10) Patent No.: US 12,111,869 B2
(45) Date of Patent: Oct. 8, 2024

(54) IDENTIFYING AN IMPLEMENTATION OF A USER-DESIRED INTERACTION USING MACHINE LEARNING

(71) Applicant: Bank of America Corporation, Charlotte, NC (US)

(72) Inventor: Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/818,191

(22) Filed: Aug. 8, 2022

(65) Prior Publication Data
US 2024/0045910 A1   Feb. 8, 2024

(51) Int. Cl.
*G06F 16/903* (2019.01)
*H04L 9/40* (2022.01)

(52) U.S. Cl.
CPC ........ *G06F 16/90335* (2019.01); *H04L 63/08* (2013.01)

(58) Field of Classification Search
CPC ........................... G06F 16/90335; H04L 63/08
See application file for complete search history.

(56) References Cited

U.S. PATENT DOCUMENTS

| | | | |
|---|---|---|---|
| 7,606,790 B2 | 10/2009 | Levy | |
| 7,809,192 B2 | 10/2010 | Gokturk et al. | |
| 7,809,722 B2 | 10/2010 | Gokturk et al. | |
| 7,836,119 B2 | 11/2010 | Lucas et al. | |
| 8,321,477 B2 | 11/2012 | Schmidtler et al. | |
| 8,452,108 B2 | 5/2013 | Walch | |
| 8,897,505 B2 | 11/2014 | Gokturk et al. | |
| 8,903,825 B2 | 12/2014 | Parker et al. | |
| 9,141,607 B1 | 9/2015 | Lee et al. | |
| 9,171,013 B2 | 10/2015 | Gokturk et al. | |
| 9,235,812 B2 | 1/2016 | Scholtes | |

(Continued)

OTHER PUBLICATIONS

Costa-Montenegro et al., "Which App? A recommender system of applications in markets: Implementation of the service for monitoring users' interaction", 2012. (Year: 2012).*

(Continued)

*Primary Examiner* — Matthew J Ellis

(57) ABSTRACT

A system for identification of an implementation of a user-desired interaction. The system receives a user-provided data item associated with the user-desired interaction type. The system determines a user group of a user. The system searches a plurality of applications to determine a plurality of interaction types supported for the determined user group. The system determines a plurality of suggested interaction types from the supported interaction types based on the user-provided data item. The suggested interaction types are ranked according to relevancy. The system retrieves, from the plurality of applications, first metadata and first NLP tags for the most relevant suggested interaction type and second metadata and second NLP tags for the next most relevant suggested interaction type. The system formats and communicates to the user the first metadata, the second metadata, the first NLP tags, and the second NLP tags according to rules of the determined user group.

20 Claims, 2 Drawing Sheets

(56) References Cited

U.S. PATENT DOCUMENTS

| | | | |
|---|---|---|---|
| 9,264,387 | B2 | 2/2016 | Scholtes et al. |
| 9,269,060 | B2 | 2/2016 | Maes |
| 9,519,804 | B2 | 12/2016 | Mitola, III |
| 9,588,965 | B2 | 3/2017 | Pedanekar et al. |
| 10,019,515 | B2 | 7/2018 | Markman et al. |
| 10,282,616 | B2 | 5/2019 | Gong et al. |
| 10,419,311 | B2 | 9/2019 | Laribi et al. |
| 10,445,569 | B1 | 10/2019 | Lin et al. |
| 10,579,372 | B1 | 3/2020 | Bahrami et al. |
| 2012/0243048 | A1* | 9/2012 | Asai ............... G06F 3/1224 358/1.18 |
| 2012/0296637 | A1 | 11/2012 | Smiley et al. |
| 2015/0227505 | A1 | 8/2015 | Morimoto |
| 2015/0339627 | A1* | 11/2015 | Brunner ........... G06Q 10/10 705/345 |
| 2016/0099949 | A1* | 4/2016 | Leondires ........ G06F 21/6218 726/28 |
| 2018/0032997 | A1* | 2/2018 | Gordon ........... G06Q 30/0269 |
| 2019/0370781 | A1* | 12/2019 | Van Os ........... G06Q 20/3223 |
| 2020/0068026 | A1* | 2/2020 | Morkovine ....... G06F 16/9536 |
| 2021/0104007 | A1 | 4/2021 | Ross et al. |

OTHER PUBLICATIONS

Li et al. "Smartphone App Usage Analysis: Datasets, Methods, and Applications", 2022, https://ieeexplore.ieee.org/stamp/stamp.jsp?arnumber=9745583. pp. 938-957 (Year: 2022).*

* cited by examiner

IDENTIFYING AN IMPLEMENTATION OF A USER-DESIRED INTERACTION USING MACHINE LEARNING

TECHNICAL FIELD

The present disclosure relates generally to user-system interactions, and more specifically to a system and method for identifying an implementation of a user-desired interaction.

BACKGROUND

During user-system communication, a user may desire to perform an interaction, but may not know how to implement the desired interaction due to the complexity of the system. The user may spend a lot of time identifying how to implement the desired interaction. In such cases, the communication between the user and the system becomes inefficient.

SUMMARY

The system described in the present disclosure provides several practical applications and technical advantages that overcome the current technical problems as described herein. The following disclosure is particularly integrated into practical applications of improving efficiency of user-system communications. This, in turn, provides an additional practical application of improving computer systems that allows users to perform desired interactions with system in an efficient manner.

In an example operation, a user may desire to perform an interaction with a system. However, the user may not know how to implement the desired interaction within the system due a complex nature of the system. The system may comprise a plurality of applications and the user-desired interactions may involve interactions that are supported by one or more applications. According, the user-system interaction may become inefficient. Furthermore, utilization of system resources (such as, for example, network bandwidth and memory) may be increased.

The disclosed system is configured to implement an artificial intelligence/machine learning algorithm to identify an implementation of the user-desired interaction. For example, the system receives a user-provided data item, with the user-provided data item providing an information associated with the user-desired interaction. The user-provided data item may include metadata associated with the user-desired interaction, a feature description associated with the user-desired interaction, a process description associated with the user-desired interaction, or an NLP tag associated with the user-desired interaction. The system may also receive user credentials from the user and determines a user group that the user belongs to. The system searches the plurality of applications to identify one or more interaction types that are supported by the plurality of applications for the identified user group. The system determines a plurality of suggested interaction types from the plurality of supported interaction types by searching the plurality of supported interaction types using the user-provided data item and ranks the plurality of suggested interaction types according to relevancy. The system retrieves, from the plurality of applications, first metadata and first NLP tags for the most relevant suggested interaction type and second metadata and second NLP tags for the next most relevant suggested interaction type. The system formats the first metadata, the second metadata, the first NLP tags, and the second NLP tags according to rules of the determined user group. The system communicates the first metadata, the second metadata, the first NLP tags, and the second NLP tags to the user. The system further gives the user an option to add additional metadata to a combined dataset comprising the first metadata, the second metadata, the first NLP tags, and the second NLP tags. In response to receiving the first metadata, the second metadata, the first NLP tags, and the second NLP tags, the user may perform the user-desired interaction.

Accordingly, the disclosed system is integrated into a practical application of improving efficiency of the user-system communications. In particular, the disclosed system allows for an efficient implementation of a user-desired interaction even when an implementation of the user-desired interaction is unknown to the user. By allowing users to perform interactions in an efficient manner as described herein, the disclosed system allows for reduced utilization of system resources, such as network bandwidth and memory.

In one embodiment, an apparatus includes a memory and a processor communicatively coupled to the memory. The memory stores a machine learning algorithm. The processor implements the machine learning algorithm. The processor receives user credentials of a user. The processor receives a user-provided data item associated with a desired interaction type. An implementation of the desired interaction type is unknown to the user. The processor determines a user group of the user based on the user credentials. The processor searches a plurality of applications to determine a plurality of interaction types supported for the determined user group. Each application of the plurality of applications stores interaction types supported for different user groups along with metadata and NLP tags associated with the interaction types. The processor determines a plurality of suggested interaction types from the plurality of supported interaction types based on the user-provided data item. The plurality of suggested interaction types are ranked according to relevancy. The processor retrieves, from the plurality of applications, first metadata and first NLP tags for the most relevant suggested interaction type and second metadata and second NLP tags for the next most relevant suggested interaction type. The processor formats the first metadata, the second metadata, the first NLP tags, and the second NLP tags according to rules of the determined user group. The processor communicates to the user the first metadata, the second metadata, the first NLP tags, and the second NLP tags.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
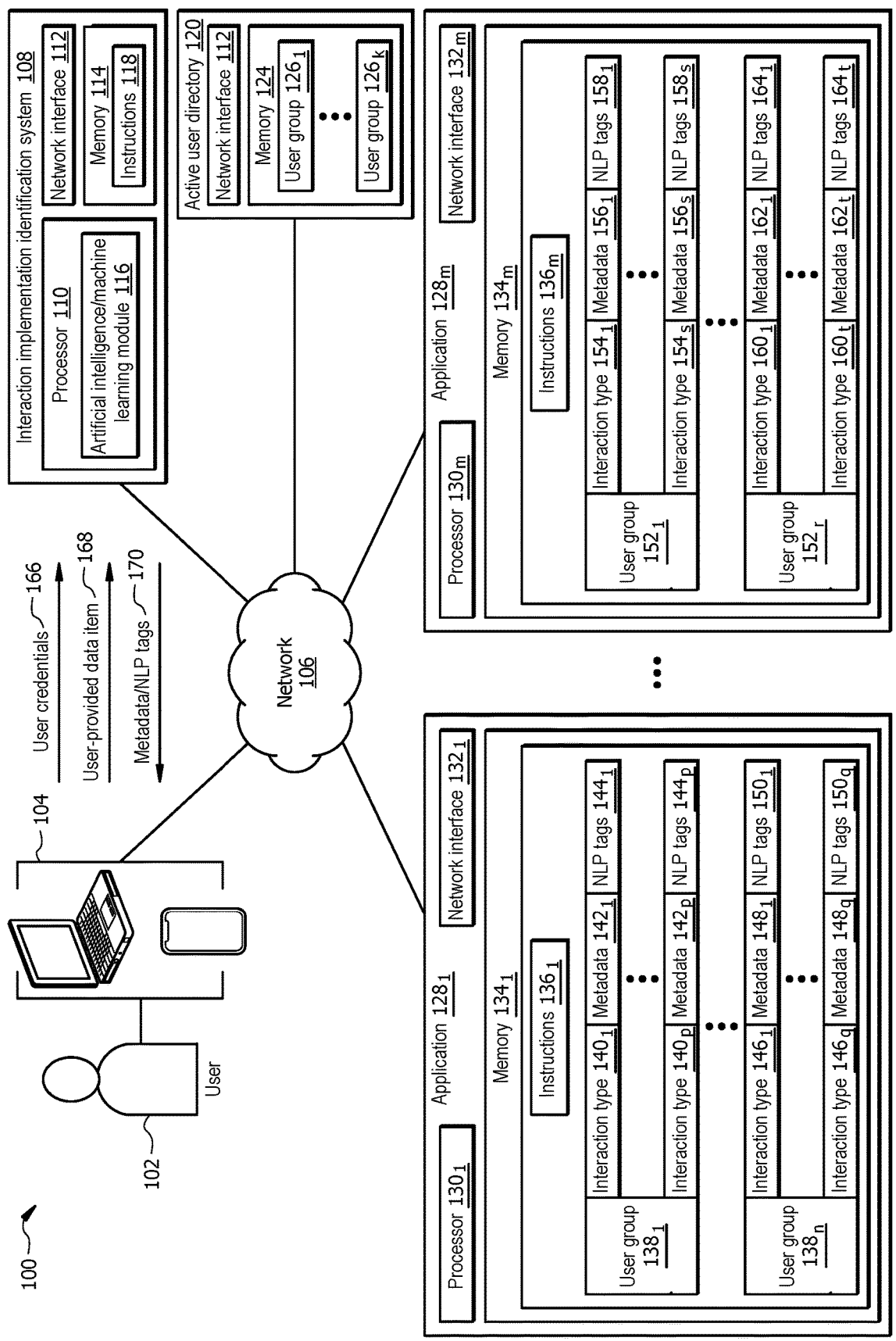
FIG. 1 illustrates an embodiment of a system configured to identify an implementation of a user-desired interaction.
Figure 2:
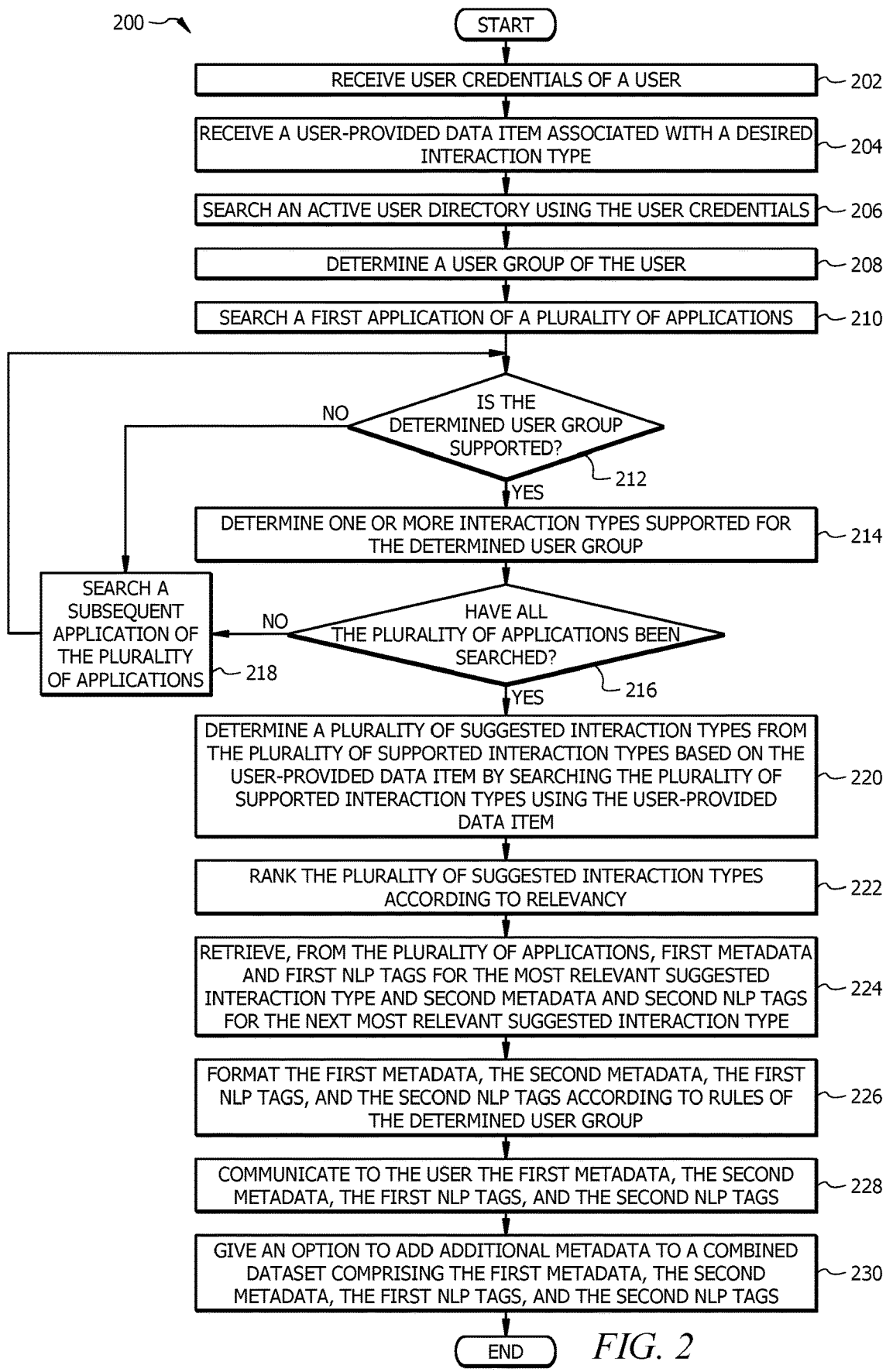
FIG. 2 illustrates an example operational flow of system of FIG. 1 for identifying an implementation of a user-desired interaction.

As described above, previous technologies fail to provide efficient and reliable solutions to identify an implementation of a user-desired interaction. Embodiments of the present disclosure and its advantages may be understood by referring to FIGS. 1 and 2. FIGS. 1 and 2 are used to describe a system and method for identifying an implementation of a user-desired interaction.

System Overview

FIG. 1 illustrates an embodiment of a system 100 that is generally configured to identify an implementation of a user-desired interaction. In certain embodiments, the system 100 comprises an interaction implementation identification system 108 that is operably coupled to a plurality of applications 128 (e.g., applications $128_1$ through $128_m$), an active user directory 120, and a computing device 104 via a network 106. Network 106 enables the communication between the components of the system 100. Interaction implementation identification system 108 comprises a processor 110 in signal communication with a memory 114. Memory 114 stores software instructions 118 that when executed by the processor 110, cause the interaction implementation identification system 108 to implement an artificial intelligence/machine learning module 116. For example, when the software instructions 148 are executed, the interaction implementation identification system 108 determines an implementation of an interaction that is desired by a user 102. In other embodiments, system 100 may not have all the components listed and/or may have other elements instead of, or in addition to, those listed above. For example, some or all the plurality of applications 128 may be implemented by fewer or even a singular application.

System Components

Network

Network 106 may be any suitable type of wireless and/or wired network. The network 106 may or may not be connected to the Internet or public network. The network 106 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 106 may be configured to support any suitable type of communication protocol as would be appreciated by one of ordinary skill in the art.

Computing Device

Computing device 104 is generally any device that is configured to process data and interact with a user 102. Examples of the computing device 104 include, but are not limited to, a personal computer, a desktop computer, a workstation, a server, a laptop, a tablet computer, a mobile phone (such as a smartphone), etc. The computing device 104 may include a user interface, such as a display, a microphone, keypad, or other appropriate terminal equipment usable by the user 102. The computing device 104 may include a hardware processor, memory, and/or circuitry (not explicitly shown) configured to perform any of the functions or actions of the computing device 104 described herein. For example, a software application designed using software code may be stored in the memory and executed by the processor to perform the functions of the computing device 104. The computing device 104 is configured to communicate with other components of the system 100 via the network 106, such as the interaction identification system 108. The user 102 may initiate one or more tasks from the computing device 104. For example, the computing device 104 may communicate user credentials 166 and/or a user-provided data item 168 to the interaction implementation identification system 108 and receive metadata/NLP tags 170 from the interaction implementation identification system 108 via the network 106.

Active User Directory

Active user directory 120 is generally a device that is configured to store user identification information and communicate with other components of the system 100 via the network 106. The active user directory 120 may comprise a memory 124 communicatively coupled to a network interface 122.

Network interface 122 is configured to enable wired and/or wireless communications (e.g., via network 106). The network interface 122 is configured to communicate data between the active user directory 120 and other components of the system 100. For example, the network interface 122 may comprise a WIFI interface, a local area network (LAN) interface, a wide area network (WAN) interface, a modem, a switch, or a router. The network interface 122 may be configured to use any suitable type of communication protocol as would be appreciated by one of ordinary skill in the art.

Memory 124 may be volatile or non-volatile and may comprise a read-only memory (ROM), random-access memory (RAM), ternary content-addressable memory (TCAM), dynamic random-access memory (DRAM), and static random-access memory (SRAM). Memory 124 may be implemented using one or more disks, tape drives, solid-state drives, and/or the like. The memory 124 may store user identification information. In certain embodiments, the memory 124 may store an information about users that are grouped in different user groups. For example, the memory 124 may store an association between a plurality of user groups 126 (e.g., user groups $126_1$ through $126_k$) and corresponding users. The users may be grouped into the plurality of user groups 126 based on user attributes, such as security clearance, for example.

In certain embodiments, the memory 124 of the active user directory 120 also stores an entitlement information for each user that is allowed to interact with the system 100. The active user directory 120 may receive the entitlement information for each user from an entitlement system that is operably coupled to the active user directory 120. The entitlement information may include an information indicating to which of the plurality of applications 128 a user has access to. For example, the entitlement information of the user 102 may indicate that the user 102 has access to all or only a subset of the plurality of applications 128.

Applications

Each of the plurality of applications 128 (e.g., applications $128_1$ through $128_m$) is generally any device that is configured to process data and communicate with other components of the system 100 via the network 106. Each of the applications 128 comprises a respective one of processors 130 (e.g., processors $130_1$ through $130_m$) in signal communication with a respective one of memories 134 (e.g., memories $134_1$ through $134_m$) and a respective one of network interfaces 132 (e.g., network interfaces $132_1$ through $132_m$).

Each of the processors 130 comprises one or more processors operably coupled to a respective one of the memories 134. Each of the processors 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 130 may be a programmable logic device, a microcontroller, a microprocessor, or any suitable combination of the preceding. The one or more processors are configured to process data and may be implemented in hardware or software. For example, each of the processors 130 may be 8-bit, 16-bit, 32-bit, 64-bit, or of any other suitable architecture. Each of the processors 130 is configured to implement various software instructions. For example, each of the processors 130 is configured to execute respective ones of software instructions 136 (e.g., software instructions $136_1$ through $136_m$) that is stored in a respective one of the memories 134 in order to perform the operations described herein.

Each of the network interfaces 132 is configured to enable wired and/or wireless communications (e.g., via network 106). Each of the network interfaces 132 is configured to communicate data between a respective one of the applications 128 and other components of the system 100. For example, each of the network interfaces 132 may comprise a WIFI interface, a local area network (LAN) interface, a wide area network (WAN) interface, a modem, a switch, or a router. Each of the network interfaces 132 may be configured to use any suitable type of communication protocol as would be appreciated by one of ordinary skill in the art.

Each of the memories 134 may be volatile or non-volatile and may comprise a read-only memory (ROM), random-access memory (RAM), ternary content-addressable memory (TCAM), dynamic random-access memory (DRAM), and static random-access memory (SRAM). Each of the memories 134 may be implemented using one or more disks, tape drives, solid-state drives, and/or the like. Each of the memories 134 is operable to store respective ones of software instructions 136, and/or any other data and instructions. Each of the software instructions 136 may comprise any suitable set of software instructions, logic, rules, or code.

In certain embodiments, each of the memories 134 is further configured to store an association between user groups and various interaction types that are supported for the user groups by a respective one of the applications 128. Furthermore, each of the memories 134 is configured to store metadata and NLP tags for each supported interaction type. Each of the applications 128 may support all or a subset of the user groups 126 stored in the active user directory 120. Different ones of the applications 128 may support same or different user groups. In certain embodiments, first user groups supported by a first one of the applications 128 may overlap with second user groups supported by a second one of the applications 128, such that at least one user group is supported by both the first one of the applications 128 and the second one of the applications 128. In other embodiments, first user groups supported by a first one of the applications 128 may not overlap with second user groups supported by a second one of the applications 128, such that no user group is supported by both the first one of the applications 128 and the second one of the applications 128.

Distinctions between different ones of the application systems 128 are described below with respect to the application systems $128_1$ and $128_m$, as an example. In certain embodiments, similar distinctions may exist between other pairs of the applications 128 and the description is not repeated herein.

The memory $134_1$ of the application $128_1$ may be configured to store interaction types supported by user groups 138 (e.g., user groups $138_1$ through $138_n$), and metadata and NLP tags for the supported interaction types. For example, the application $128_1$ may support interaction types 140 (e.g., interaction types $140_1$ through $140_p$) for the user group $138_1$, and may store respective metadata 142 (e.g., metadata $142_1$ through $142_p$) and NLP tags 144 (e.g., NLP tags $144_1$ through $144_p$) in the memory $134_1$. The application $128_1$ may support interaction types 146 (e.g., interaction types $146_1$ through $146_q$) for the user group $138_n$, and may store respective metadata 148 (e.g., metadata $148_1$ through $148_q$) and NLP tags 150 (e.g., NLP tags $150_1$ through $150_q$) in the memory $134_1$.

In certain embodiments, the application $128_1$ may support a same interaction type for different ones of the user groups 138. For example, the application $128_1$ may support a same interaction type for both the user group $138_1$ and the user group $128_n$. In such embodiments, one of the interaction types 140 may be same as one of the interaction types 146. In other embodiments, the application $128_1$ may not support a same interaction type for different ones of the user groups 138. For example, the application $128_1$ may not support a same interaction type for both the user group $138_1$ and the user group $128_n$.

In certain embodiments, the memory $134_1$ of the application $128_1$ may be configured to store interaction types supported for each of the user groups 126 stored in the active user directory 120. In such embodiments, the user groups $138_1$ through $138_n$ may correspond to the user groups $126_1$ through $126_k$, respectively, with the number n of the user groups 138 supported by the application $128_1$ being same as the number k of the user groups 126 stored in the active user directory 120.

In other embodiments, the memory $134_1$ of the application $128_1$ may be configured to store interaction types supported for a subset of the user groups 126 stored in the active user directory. In such embodiments, the user groups $138_1$ through $138_n$ may correspond to a respective subset of the user groups $126_1$ through $126_k$, with the number n of the user groups 138 supported by the application $128_1$ being less than the number k of the user groups 126 stored in the active user directory 120.

The memory $134_m$ of the application $128_m$ may be configured to store interaction types supported by user groups 152 (e.g., user groups $152_1$ through $152_r$), and metadata and NLP tags for the supported interaction types. For example, the application $128_m$ may support interaction types 154 (e.g., interaction types $154_1$ through $154_s$) for the user group $152_1$, and may store respective metadata 156 (e.g., metadata $156_1$ through $156_s$) and NLP tags 158 (e.g., NLP tags $158_1$ through $158_s$) in the memory $134_m$. Furthermore, the application $128_m$ may support interaction types 160 (e.g., interaction types $160_1$ through $160_t$) for the user group $152_r$, and may store respective metadata 162 (e.g., metadata $162_1$ through $162_t$ and NLP tags 164 (e.g., NLP tags $164_1$ through $164_t$) in the memory $134_m$.

In certain embodiments, the application $128_m$ may support a same interaction type for different ones of the user groups 152. For example, the application $128_m$ may support a same interaction type for both the user group $152_1$ and the user group $152_r$. In such embodiments, one of the interaction types 154 may be same as one of the interaction types 160. In other embodiments, the application $128_m$ may not support a same interaction type for different ones of the user groups 152. For example, the application system $128_m$ may not support a same interaction type for both the user group $152_1$ and the user group $152_r$.

In certain embodiments, the memory $134_m$ of the application $128_m$ may be configured to store interaction types supported for each of the user groups 126 stored in the active user directory 120. In such embodiments, the user groups $152_1$ through $158_r$ correspond to the user groups $126_1$ through $126_k$, respectively, with the number r of the user groups 152 supported by the application system $128_m$ being same as the number k of the user groups 126 stored in the active user directory 120.

In other embodiments, the memory $134_m$ of the application $128_m$ may be configured to store interaction types supported for a subset of the user groups 126 stored in the active user directory 120. In such embodiments, the user groups $152_1$ through $152_r$ correspond to a respective subset of the user groups $126_1$ through $126_k$, with the number r of the user groups 152 supported by the application system $128_m$ being less than the number k of the user groups 126 stored in the active user directory 120.

In certain embodiments, the user groups supported by one of the applications 128 may overlap with the user groups supported by another one of the applications 128, such that at least one of the user groups is supported by both applications. For example, the user groups 138 supported by the application $128_1$ may overlap with the user groups 152 supported by the application $128_m$, such that at least one of the user groups is supported by both the application $128_1$ and the application $128_m$. In such embodiments, the user groups 138 and the user groups 152 comprise overlapping subsets of user groups.

In other embodiments, the user groups supported by one of the applications 128 may not overlap with the user groups supported by another one of the applications 128, such that no user group is supported by both applications. For example, the user groups 138 supported by the application $128_1$ may not overlap with the user groups 152 supported by the application $128_m$, such that no user group is supported by both the application system $128_1$ and the application system $128_m$. In such embodiments, the user groups 138 and the user groups 152 comprise non-overlapping subsets of user groups.

Interaction Implementation Identification System

The interaction implementation identification system 108 is generally any device that is configured to process data and communicate with other components of the system 100 via the network 106. The interaction implementation identification system 108 may comprise a processor 110 in signal communication with a memory 114 and a network interface 112.

Processor 110 comprises one or more processors operably coupled to the memory 114. The processor 110 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 110 may be a programmable logic device, a microcontroller, a microprocessor, or any suitable combination of the preceding. The one or more processors are configured to process data and may be implemented in hardware or software. For example, the processor 110 may be 8-bit, 16-bit, 32-bit, 64-bit, or of any other suitable architecture. The one or more processors are configured to implement various software instructions to perform the operations described herein. For example, the one or more processors are configured to execute software instructions 118 and to implement the artificial intelligence/machine learning (AI/ML) module 116 and perform one or more functions described herein. In this way, processor 110 may be a special-purpose computer designed to implement the functions disclosed herein. The processor 110 is configured to operate as described in FIGS. 1 and 2.

Network interface 112 is configured to enable wired and/or wireless communications (e.g., via network 106). The network interface 112 is configured to communicate data between the interaction identification system and other components of the system 100. For example, the network interface 112 may comprise a WIFI interface, a local area network (LAN) interface, a wide area network (WAN) interface, a modem, a switch, or a router. The processor 110 is configured to send and receive data using the network interface 112. The network interface 112 may be configured to use any suitable type of communication protocol as would be appreciated by one of ordinary skill in the art.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. The memory 114 may store any of the information described in FIGS. 1 and 2 along with any other data, instructions, logic, rules, or code operable to implement the function(s) described herein when executed by processors 110. The memory 114 is operable to store software instructions 118, and/or any other data and instructions. The software instructions 118 may comprise any suitable set of software instructions, logic, rules, or code operable to be executed by the processor 110.

Artificial Intelligence/Machine Learning Module

AI/ML module 116 may be implemented by the processor 110 executing the software instructions 118, and is generally configured to determine an implementation of an interaction that is desired by the user 102 based on the user provided data item 168. For example, the AI/ML module 116 provides a suggested implementation for the user-desired interaction type.

In certain embodiments, the AI/ML module 116 may be implemented by a support vector machine, neural network, random forest, k-means clustering, etc. In certain embodiments, the AI/ML module 116 may be implemented by a plurality of neural network layers, convolutional neural network layers, Long-Short-Term-Memory (LSTM) layers, Bi-directional LSTM layers, recurrent neural network layers, and the like. In certain embodiments, the AI/ML module 116 may be implemented by a text processing, natural language processing, and the like. In certain embodiments, the AI/ML module 116 may be implemented by unsupervised, semi-supervised, and/or supervised machine learning techniques.

In certain embodiments, the AI/ML module 116 may be configured to perform operations of method 200 (see FIG. 2) as described below in greater detail.

Example Method for Identifying an Implementation of a User-Desired Interaction Type Using Machine Learning FIG. 2 illustrates an example flowchart of a method 200 for identifying an implementation of a user-desired interaction. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions 118 of FIG. 1, stored on non-transitory, tangible, machine-readable medium (e.g., memory 114 of FIG. 1) that when executed by one or more processors (e.g., processor 110 of FIG. 1) implements an AI/ML module (e.g., AI/ML module 116 of FIG. 1) and may cause the one or more processors to perform operations 202-230.

At operation 202, the processor 110 of the interaction implementation identification system 108 (see FIG. 1) receives user credentials 166 from the user 102 and/or the computing device 104. The user credentials 166 may comprise a username/password combination, or any other suitable information that may be used to authenticate the user 102. In certain embodiments, the user 102 would like to interact with the system 100 to perform a desired interaction, but may not know how implement the desired interaction due to complexity of the system 100. Instead, the user may know metadata associated with the desired interaction, a feature description associated with the desired interaction, a process description associated with the desired interaction, or NLP tags associated with the desired interaction At operation 204, the processor 110 receives a user-provided data item 168 from the user 102 and/or the computing device 104. The user provided data item 168 may comprise metadata associated with the desired interaction, a feature description associated with the desired interaction, a process description associated with the desired interaction, or NLP tags associated with the desired interaction.

At operation 206, the processor 110 searches the active user directory 120 using the user credentials 166.

At operation 208, in response to the user credentials 166 of the user 102 matching a respective user information stored in the active user directory 120, the processor 110 determines a user group of the user 102. The user group of the user may be any of the user groups $126_1$ through $126_k$ (see FIG. 1).

In certain embodiments, in response to the user credentials 166 of the user 102 matching the respective user information stored in the active user directory 120, the processor 110 may also determine an entitlement information of the user 102. The entitlement information of the user 102 may indicate that the user 102 has access to all or only a subset of the plurality of applications 128.

At operation 210, the processor 110 starts searching a plurality of application. In particular, the processor 110 searches a first application of the plurality of applications. In embodiments when the entitlement information of the user 102 indicates that the user 102 has access to all of the plurality of applications 128 (see FIG. 1), the plurality of applications that are searched by the processor 110 include all of the plurality of applications 128. In embodiments when the entitlement information of the user 102 indicates that the user 102 has access to a subset of the plurality of applications 128, the plurality of applications that are searched by the processor 110 include the subset of the plurality of applications 128. The first application may be any of the applications 128.

At operation 212, the processor 110 determines if the determined user group of the user 102 is supported by the first application by comparing the determined user group of the user 102 with user groups supported by the first application. For example, if the first application is the application $128_1$, the processor 110 determines if the determined user group matches one of the user groups 138 supported by the application $128_1$. If there is a match between the determined user group and one of the user groups supported by the first application, the process continues to operation 214.

At operation 214, the processor 110 determines one or more interaction types that are supported by the first application for the determined user group. For example, if the first application is the application $128_1$ and the determined user group matches the user group $138_1$, the processor 110 determines that the interaction types 140 are supported by the first application for the determined user group.

Subsequently, the process goes to the operation 216, where the processor 110 determines if all applications have been searched. If processor 100 determines that all applications have not been searched, the process goes to operation 218.

If at operation 212, the processor 110 determines that there is no match between the determined user group and any of the user groups supported by the first application, the process also continues to operation 218.

At operation 218, the processor 110 searches a subsequent application of the plurality of applications. Subsequently, process goes to operation 212. For example, if the first application is the application $128_1$, the subsequent application may be any application of the plurality of application 128 other than $128_1$.

Subsequently the process goes to operation 212. In certain embodiments, the operations 212, 214, 216, and 218 are repeated until all applications have been searched and all interaction types supported for the determined user group have been identified.

If at operation 216, the processor 110 determines that all applications have been searched the process goes to operation 220.

At operation 220, the processor 110 determines a plurality of suggested interaction types from the plurality of supported interaction types based on the user-provided data item 168. In certain embodiments, the determination process includes searching the plurality of supported interaction types using the user-provided data item 168.

At operation 222, the processor 110 ranks the plurality of suggested interaction types according to relevancy.

At operation 224, the processor 110 retrieves from the plurality of applications first metadata and first NLP tags for the most relevant suggested interaction type and second metadata and second NLP tags for the next most relevant suggested interaction type. For example, if the processor 110 determines that the most relevant suggested interaction type is the interaction type $140_1$ of application $128_1$ and the next most relevant suggested interaction type is the interaction type $154_1$ of application $128_m$, the processor 110 retrieves the metadata $142_1$ and the NLP tags $144_1$ from the application $128_1$ and the metadata $156_1$ and the NLP tags $158_1$ from the application $128_m$.

At operation 226, the processor 110 formats the first metadata, the second metadata, the first NLP tags, and the second NLP tags according to rules of the determined user group.

At operation 228, the processor communicates the first metadata, the second metadata, the first NLP tags, and the second NLP tags to the user 102 and/or the computing device 104.

At operation 230, the processor 110 gives the user 102 an option to add additional metadata and/or additional NLP tags to a combined dataset comprising the first metadata, the second metadata, the first NLP tags, and the second NLP tags. The additional metadata and/or additional NLP tags may comprise an additional information corresponding to the user-desired interaction.

In certain embodiments, in response to receiving the first metadata, the second metadata, the first NLP tags, and the second NLP tags, the user performs the user-desired interaction.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
a memory storing a machine learning algorithm; and
a processor communicatively coupled to the memory, wherein the processor, when implementing the machine learning algorithm, is configured to:
receive user credentials of a user;
receive, from the user, a user-provided data item associated with a desired interaction type of the user, wherein an implementation of the desired interaction type is unknown to the user;
determine a user group of the user based on the user credentials;
search at least a first application in a plurality of applications to determine whether the determined user group is supported by the first application by comparing the determined user group with one or more first user groups supported by the first application;
in response to determining that the determined user group matches the one or more first user groups supported by the first application, determine one or more first interaction types that are supported by the first application for the determined user group, wherein the first application stores the one or more first interaction types along with first metadata and first NLP tags associated with the one or more first interaction types;
search a subsequent application in the plurality of applications to determine whether the determined user group is supported by the subsequent application by comparing the determined user group with one or more subsequent user groups supported by the subsequent application;
in response to determining that the determined user group matches the one or more subsequent user groups supported by the subsequent application, determine one or more subsequent interaction types that are supported by the subsequent application for the determined user group, wherein the subsequent application stores the one or more subsequent interaction types along with second metadata and second NLP tags associated with the one or more subsequent interaction types;
determine a plurality of suggested interaction types from the plurality of supported interaction types based on the user-provided data item, wherein the plurality of suggested interaction types are ranked according to relevancy;
retrieve, from the plurality of applications, the first metadata and the first NLP tags for the most relevant suggested interaction type and the second metadata and the second NLP tags for the next most relevant suggested interaction type;
format the first metadata, the second metadata, the first NLP tags, and the second NLP tags according to rules of the determined user group; and
communicate to the user the first metadata, the second metadata, the first NLP tags, and the second NLP tags.

2. The apparatus of claim 1, wherein determining the plurality of suggested interaction types from the plurality of supported interaction types based on the user-provided data item comprises searching the plurality of supported interaction types using the user-provided data item.

3. The apparatus of claim 1, wherein the user-provided data item comprises metadata associated with the desired interaction type, a feature description associated with the desired interaction type, a process description associated with the desired interaction type, or an NLP tag associated with the desired interaction type.

4. The apparatus of claim 1, wherein the processor is further configured to:
give an option to add additional metadata to a combined dataset comprising the first metadata, the second metadata, the first NLP tags, and the second NLP tags, wherein the additional metadata comprises an additional information corresponding to the desired interaction type.

5. The apparatus of claim 1, wherein after receiving the user-provided data, the processor is further configured to:
match the user credentials of the user to a respective user information stored in an active user directory; and
in response to the user credentials matching the respective user information stored in the active user directory, the processor is further configured to:
determine entitlement information of the user based on the user information stored in the active user directory, wherein the entitlement information of the user is indicative of whether the user has access to one or more of a plurality of applications.

6. The apparatus of claim 1, wherein each application of the plurality of applications resides in a separate system.

7. The apparatus of claim 1, wherein some or all of the plurality of applications reside in a same system.

8. A method comprising:
receiving user credentials of a user;
receiving, from the user, a user-provided data item associated with a desired interaction type of the user, wherein an implementation of the desired interaction type is unknown to the user;
determining a user group of the user based on the user credentials;
searching at least a first application in a plurality of applications to determine whether the determined user group is supported by the first application by comparing the determined user group with one or more first user groups supported by the first application;
in response to determining that the determined user group matches the one or more first user groups supported by the first application, determining one or more first interaction types that are supported by the first application for the determined user group, wherein the first application stores the one or more first interaction types along with first metadata and first NLP tags associated with the one or more first interaction types;
search a subsequent application in the plurality of applications to determine whether the determined user group is supported by the subsequent application by comparing the determined user group with one or more subsequent user groups supported by the subsequent application;
in response to determining that the determined user group matches the one or more subsequent user groups supported by the subsequent application, determine one or more subsequent interaction types that are supported by the subsequent application for the determined user group, wherein the subsequent application stores the one or more subsequent interaction types along with second metadata and second NLP tags associated with the one or more subsequent interaction types;
determining a plurality of suggested interaction types from the plurality of supported interaction types based on the user-provided data item, wherein the plurality of suggested interaction types are ranked according to relevancy;
retrieving, from the plurality of applications, the first metadata and the first NLP tags for the most relevant suggested interaction type and the second metadata and the second NLP tags for the next most relevant suggested interaction type;
formatting the first metadata, the second metadata, the first NLP tags, and the second NLP tags according to rules of the determined user group; and
communicating to the user the first metadata, the second metadata, the first NLP tags, and the second NLP tags.

9. The method of claim 8, wherein determining the plurality of suggested interaction types from the plurality of supported interaction types based on the user-provided data item comprises searching the plurality of supported interaction types using the user-provided data item.

10. The method of claim 8, wherein the user-provided data item comprises metadata associated with the desired interaction type, a feature description associated with the desired interaction type, a process description associated with the desired interaction type, or an NLP tag associated with the desired interaction type.

11. The method of claim 8, further comprising:
giving an option to add additional metadata to a combined dataset comprising the first metadata, the second metadata, the first NLP tags, and the second NLP tags, wherein the additional metadata comprises an additional information corresponding to the desired interaction type.

12. The method of claim 8, wherein after receiving the user-provided data, the method further comprises:
matching the user credentials of the user to a respective user information stored in an active user directory; and
in response to the user credentials matching the respective user information stored in the active user directory, the method further comprises:
determining entitlement information of the user based on the user information stored in the active user directory, wherein the entitlement information of the user is indicative of whether the user has access to one or more of a plurality of applications.

13. The method of claim 8, wherein each application of the plurality of applications resides in a separate system.

14. The method of claim 8, wherein some or all of the plurality of applications reside in a same system.

15. A non-transitory computer-readable medium that stores instructions that, when executed by one or more processors, cause the one or more processors to:
receive user credentials of a user;
receive, from the user, a user-provided data item associated with a desired interaction type of the user, wherein an implementation of the desired interaction type is unknown to the user;
determine a user group of the user based on the user credentials;
search at least a first application in a plurality of applications to determine whether the determined user group is supported by the first application by comparing the determined user group with one or more first user groups supported by the first application;
in response to determining that the determined user group matches the one or more first user groups supported by the first application, determine one or more first interaction types that are supported by the first application for the determined user group, wherein the first application stores the one or more first interaction types along with first metadata and first NLP tags associated with the one or more first interaction types;
search a subsequent application in the plurality of applications to determine whether the determined user group is supported by the subsequent application by comparing the determined user group with one or more subsequent user groups supported by the subsequent application;
in response to determining that the determined user group matches the one or more subsequent user groups supported by the subsequent application, determine one or more subsequent interaction types that are supported by the subsequent application for the determined user group, wherein the subsequent application stores the one or more subsequent interaction types along with second metadata and second NLP tags associated with the one or more subsequent interaction types;
determine a plurality of suggested interaction types from the plurality of supported interaction types based on the user-provided data item, wherein the plurality of suggested interaction types are ranked according to relevancy;

retrieve, from the plurality of applications, the first metadata and the first NLP tags for the most relevant suggested interaction type and the second metadata and the second NLP tags for the next most relevant suggested interaction type;

format the first metadata, the second metadata, the first NLP tags, and the second NLP tags according to rules of the determined user group; and communicate to the user the first metadata, the second metadata, the first NLP tags, and the second NLP tags.

16. The non-transitory computer-readable medium of claim 15, wherein determining the plurality of suggested interaction types from the plurality of supported interaction types based on the user-provided data item comprises searching the plurality of supported interaction types using the user-provided data item.

17. The non-transitory computer-readable medium of claim 15, wherein the user-provided data item comprises metadata associated with the desired interaction type, a feature description associated with the desired interaction type, a process description associated with the desired interaction type, or an NLP tag associated with the desired interaction type.

18. The non-transitory computer-readable medium of claim 15, wherein the instructions, when executed by the one or more processors, further cause the one or more processors to:

give an option to add additional metadata to a combined dataset comprising the first metadata, the second metadata, the first NLP tags, and the second NLP tags, wherein the additional metadata comprises an additional information corresponding to the desired interaction type.

19. The non-transitory computer-readable medium of claim 15, wherein after receiving the user-provided data, the processor is further configured to:

match the user credentials of the user to a respective user information stored in an active user directory; and in response to the user credentials matching the respective user information stored in the active user directory, the processor is further configured to:

determine entitlement information of the user based on the user information stored in the active user directory, wherein the entitlement information of the user is indicative of whether the user has access to one or more of a plurality of applications.

20. The non-transitory computer-readable medium of claim 15, wherein each application of the plurality of applications resides in a separate system.

* * * * *